Sept. 10, 1935.   W. B. WIEGAND   2,013,775
CARBON BLACK
Filed Nov. 29, 1933
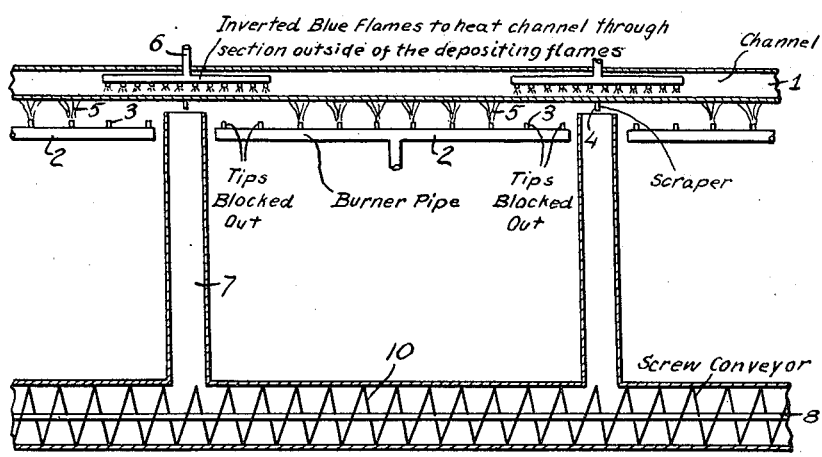
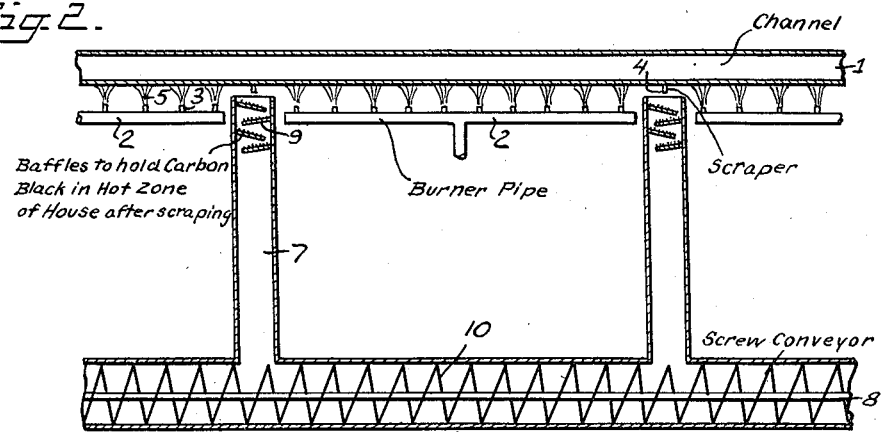
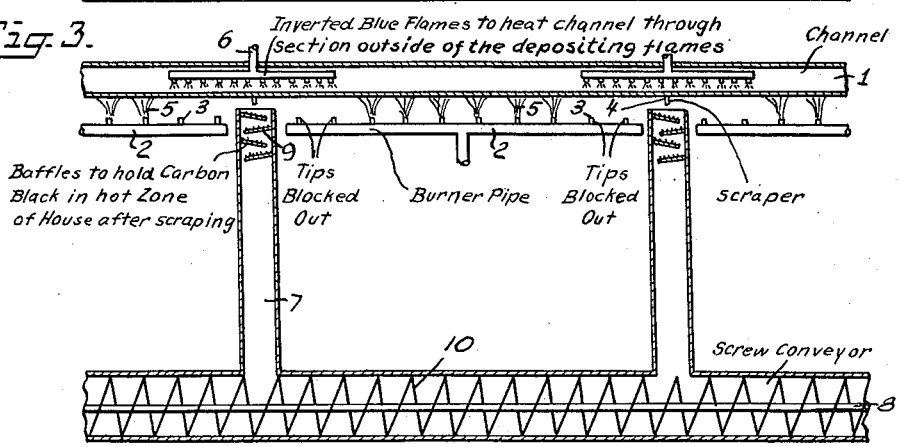
INVENTOR
W. B. Wiegand
BY
Bennie, Davis, Marvin & Edmonds.
ATTORNEYS Patented Sept. 10, 1935

2,013,775

UNITED STATES PATENT OFFICE 2,013,775

CARBON BLACK

William Bryan Wiegand, Sound Beach, Conn.

Application November 29, 1933, Serial No. 700,196

2 Claims. (Cl. 134—60)

This invention relates to carbon black and more particularly to an improved carbon black product of special value as a pigment and the like in the manufacture of paints, lacquers, inks, plastics and similar materials and characterized by its improved color and workability.

Carbon black is used commercially for a wide variety of purposes, and the varying requirements of different purposes have led to the development of two different types of carbon black products. For use in rubber compounding, the ability of the product to strengthen or reinforce the rubber compound is an important quality. Also, for this use, the influence of the product upon the rate of vulcanization of the rubber compound is an important quality. For use in rubber compounding, either of these qualities, for example, is more important than the color or workability of the product. However, for use in paint, lacquer, varnish, ink and the like, color and workability are the qualities of primary importance. This invention relates particularly to a carbon black product of special value in applications in which color and workability are of primary importance and which belongs to that general class of carbon black referred to herein as "color blacks."

In the conventional process of manufacture of carbon black, a hydrocarbon gas flowing from any of various types of burner tips is burned with a supply of oxygen limited to permit only partial combustion, in corresponding types of flames which are usually identified as round, bat-wing or fish-tail. Restriction and regulation of the supply of air, to control the extent of combustion of the hydrocarbon gas, is commonly designated "drafting." The flames are caused to impinge upon a relatively cool metallic surface on which the carbon black formed in the process is deposited. The deposited carbon black is removed by scrapers, allowed to fall thru hoppers to conveyors, usually of the screw type, and thru the conveyors is discharged to bolting and packing operations. The combustion operation is carried out in so-called "burner houses" from which the carbon black is removed by means of these conveyors.

In the conventional process of manufacture of carbon black, color and workability can be controlled within limits, by adjustments of the size and shape of the flames, of the degree of drafting and also, to some extent, by the relative position, speed of motion, etc., of the collecting surfaces. For example, color can be improved by the use of a burner tip with a smaller orifice in conjunction with an increase in drafting, or, similar, tips producing a fish-tail flame may be substituted for slotted tips. The expedients for improving color heretofore available, however, have suffered from their inability to improve color without diminishing workability and without markedly diminishing the net yield of carbon black recovered from the hydrocarbon gas. Similarly with respect to workability, the expedients heretofore available have suffered from their inability to improve workability without impairing the color and without diminishing the yield.

Prior to my present invention, all carbon blacks known to me have been subject to the limitation that roughly, in proportion as their color improves, their workability diminishes and as their workability improves, their color diminishes.

The novel feature of this invention is the embodiment in one and the same color black of a high degree of color intensity simultaneously with, rather than opposed to, a high degree of workability.

I use the terms "color" or "color intensity" herein to refer generally to the intensity of the black effect or blackness of paints, lacquers, varnishes, inks and similar mixtures in which the particular carbon black in question has been incorporated. In referring to improved color or better color herein, I means that less light is reflected from the surface embodying the carbon black in question.

It is customary in the art to compare the color of blacks by the optical reaction of the human eye to the various specimens which have been previously mixed with some vehicle, such as linseed oil, mineral oil or the like. However, differences in color so evaluated manifestly depend upon the personal equation of the observer and consequently cannot be precisely and quantitatively expressed. I shall, therefore, define color herein in terms of instrumental readings obtained as follows: I weigh onto a plate 0.2 gram of the carbon black to be evaluated and to this I add 2 cc. of pale grinding linseed oil. This mixture is then mulled 100 strokes, picking up after each 25 strokes. For this mulling operation a 3-inch glass muller is used which is weighted with lead or the like so that its total weight is 15 pounds. A smear of this mixture 1½ inches in diameter is then placed on the center of a 2-inch by 3-inch glass slide, free from dirt and imperfections. This slide is then placed in the prescribed position in a "nigrometer", a standard machine for measuring blackness sold by Fisher Scientific Company of Pittsburgh, Pennsylvania, glass side toward the machine. Adjustments of the nigrometer are then made until the two concentric discs seen thru the eye-piece merge into one and the color index is then read. An average of five readings is taken as the color value.

The nigrometer is so designed that the blacker the carbon, the lower the reading. However, for convenience, I prefer to have a higher numerical value represent a higher intensity of blackness and therefore I subtract the average value of the readings given by the nigrometer from 100 and take the remainder as my color index.

The term "workability" as used herein refers to the ease of grinding or mixing the product with or dispersion of the product in paint, lacquer and varnish vehicles or other liquid media, stability of such mixtures and dispersions, and, in the case of inks and the like, the quality commonly referred to as "length." The terms dispersibility, stability, length and ease of grinding used in this art cover various aspects of the general property in question, depending upon the specific industry in which the black is to be used. In the case of nitrocellulose and other lacquers, workability involves ease and permanency or stability of dissemination thruout the lacquer vehicle; in the paint industry, ease of grinding. In the ink industry, easy flowing properties, length, etc., are important desiderata.

As a measure of workability, whereby my improved product may be distinguished from previously known carbon blacks, I have chosen, as perhaps the most generally significant and most easily determined index of workability, the oil absorption of the carbon black corresponding to a definite arbitrary consistency of a mixture containing it, as measured by the flow characteristic of that mixture. In other words, various percentages of the black in question are mixed with a vehicle until such a composition has been attained as will endow the mixture with a fixed capacity for flowing at room temperature.

For example, with one black a 10% mixture of the same in lithographic varnish may provide a mobile, readily flowing paste which will give a definite flow number on the instrument hereinafter described. Of another black, 15% may be used in the same vehicle, and still give the same flow characteristics as the 10% mixture of the first black.

When a mixture has been attained, as described above, which has this fixed flow characteristic, the percentage of black present in that mixture is a measure of the oil absorption characteristic of the particular black in question.

The method employed to determine the flow characteristics of the mixtures, and, from these flow characteristics, the oil absorption index of the black, will now be described in detail so that workability in term of oil absorption of the carbon black may be readily determined by anyone skilled in the art of pigment testing.

The instrument which I use for measuring flow characteristics consists of a series of 8 highly polished, chromium plated, ⅞-inch half-round grooves, each 14 inches long. These grooves are graduated by 1/10-inch divisions placed alongside of and without the groove. The instrument is arranged so that these grooves can be held in a horizontal position or simultaneously tilted at a readily determinable angle.

In determining the oil absorption characteristic of a given black, several specimens are prepared consisting of mixtures of varying percentages of the black in No. 4 lithographic varnish (acid number approximately 17). With the instrument set so that the grooves are in a horizontal position, a definite quantity of one of the above-referred to specimens is placed in one of the grooves and a definite quantity of another of the specimens is placed in another groove, and so on. The instrument is allowed to remain so that the grooves are in a horizontal position for ten minutes after the last of the specimens is in place. The instrument is then set so that the grooves are inclined at an angle of 5° from the horizontal and the length of flow of the individual specimens is read every hour for a period of four hours.

The hourly readings for a given black may then be plotted on a graph against the cubic centimeters of lithographic varnish per gram of black in the specimen. From this graph the approximate varnish-black ratio which would give a standard flow may then be read.

A wide band of ratios may be tried as a preliminary to approximate the ratio of varnish to black necessary to give the standard flow characteristic and a narrow band on either side of the approximated value may then be run to determine the exact ratio necessary to give the standard flow characteristic. For this work the following standard flow characteristic is used:

| | Flow |
|---|---|
| 1 hour | 7 inches |
| 2 hours | 9.3 inches |
| 3 hours | 10.8 inches |
| 4 hours | 12.3 inches |

The ratios found for each hour are then averaged and this average is termed the oil absorption index.

Since the volume of the specimen placed in the groove of the instrument has a bearing on the length of flow, the volume used must be standardized. In my determinations I have in each case used 2.622 cc. to conform to an empirical control test already in use. In my calculations the specific gravity of carbon black is taken as 1.75 and the specific gravity of the No. 4 lithographic varnish is taken as 0.95. Both the black and varnish (acid number approximately 17) are weighed on a balance sensitive to 0.1 milligram.

As an example of the preparation of a specimen for determination of oil absorption index: weigh out 0.2 gram of black. The volume of this weight is $$\frac{.2}{1.75}$$

or .114 cc. The volume of varnish is therefore 2.622 cc. minus 0.114 cc. or 2.508 cc. The above referred to varnish would weigh 2.508 × .95 or 2.383 grams. The ratio of the varnish to the black in this specimen is therefore $$\frac{2.508}{.2}$$

or 12.540 cc. of varnish per gram of black.

In preparing the specimen, the carbon black and lithographic varnish mixture are mulled with the same apparatus heretofore described as having been used by me in preparing the specimen for my color test, but in the present instance the mixture is mulled 150 strokes, picking up after each 50 strokes.

By means of the methods above described, the properties of various carbon blacks as to color and workability may be accurately determined and compared and I shall herein define and claim my invention in terms of characteristics of the product so determined.

As above stated, carbon blacks may be divided into two general classes, namely, those used primarily for the strengthening and reinforcing of rubber and other material without regard to color and those referred to as color blacks to which my present invention belongs, which are of special value in applications in which color is of primary importance.

Tho the difference in color intensity or blackness between these two classes of carbon black is readily apparent to the human eye, this difference is illustrated precisely and quantitatively by the procedure hereinbefore described. For example the color indices of representative samples of carbon black of the former class, as determined by the above described procedure are given below in Table I, and color indices of high intensity color black belonging to the latter class, as determined by the same procedure, appear in Table II below.

Table I

| Black | Color index |
|---|---|
| A | 18.3 |
| B | 19.6 |
| C | 20.4 |

Table II

| Black | Color index |
|---|---|
| D | 29.8 |
| E | 31.4 |
| F | 38.3 |
| G | 38.7 |
| H | 40.2 |
| I | 31.8 |

It will be observed that the color indices of the blacks of these two general classes fall within distinctly different ranges. The color blacks, which include those of the present invention, range in color indices from approximate 30 up to approximate 40 on the above described color scale and the former class of blacks are of a distinctly lower order of color intensity.

The workability of these color blacks, listed in Table II, as indicated by the oil absorption index determined by the procedure hereinbefore described, is given in the following Tables III and IV. The blacks appearing in Table III are representative of the previously known type of color blacks which are characterized by a low degree of workability and which are not contemplated by the present invention, while those appearing in Table IV are my new carbon blacks which are the subject-matter of the present invention:

Table III

| Black | Oil absorption index |
|---|---|
| D | 45.8 |
| F | 47.9 |

Table IV

| Black | Oil absorption index |
|---|---|
| E | 26.3 |
| G | 32.9 |
| H | 26.3 |
| I | 15.3 |

The substance of my present invention, however, is not a carbon black product or a group of such product of any one range of color intensity as such, nor of any particular degree of workability as such. The essence of my invention resides in a group of new high intensity color blacks which embody at one and the same time a high color intensity and a high degree of workability. This characteristic is conveniently expressed in terms of the ratio of the color index to the oil absorption index, both determined as hereinbefore described. This ratio is obtained by dividing the color index by the oil absorption index.

The ratios of the color index to the oil absorption index of the color blacks previously listed in Tables II, III and IV appear below in Tables V and VI.

Table V

| Black | Ratio: $\frac{\text{Color index}}{\text{Oil absorption index}}$ |
|---|---|
| D | .65 |
| F | .80 |

Table VI

| Black | Ratio: $\frac{\text{Color index}}{\text{Oil absorption index}}$ |
|---|---|
| E | 1.20 |
| G | 1.18 |
| H | 1.53 |
| I | 2.08 |

The physical significance of these ratios is that in the blacks of my present invention, if regard be had to their oil absorption or workability, it will be found that their color intensity is distinctly higher than that of prior art blacks. If, on the other hand, attention be focused on the color index of my new blacks, it will be found that their corresponding oil absorption indices are distinctly lower and consequently the degree of workability is distinctly higher than in the prior art blacks; for, as previously illustrated, the color index increases numerically as the color intensity increases and the oil absorption index decreases numerically as workability of the product increases.

The high ratio is therefore to be interpreted either from the point of view of improved color in relation to fixed oil absorption properties or workability or conversely from the point of view of lower oil absorption in regard to fixed color properties.

One process which I have found advantageous in producing my new and improved color black and several methods and means for carrying out said process are described in my co-pending application Serial No. 630,216 filed August 24, 1932 of which the present application is in part a continuation. According to that method, a new step is incorporated in the conventional process of manufacturing carbon black which makes it possible simultaneously to improve color and workability and to control these qualities independently within wide limits and to accomplish these results with a minimum sacrifice of yield of the carbon black product. This new step consists essentially of controlled oxidation of the carbon black, that is the exposure of the carbon black to an oxidizing atmosphere while at a temperature upward of 300° C. Temperatures in the range of 300° C. up to 1000° C. are useful in carrying out this process and temperatures approximating 400° C. are particularly advantageous. This controlled oxidation is with advantage carried out in an atmosphere having an oxidation capacity less than air. This step may be carried out in various ways and may be embodied in the complete manufacturing process in various ways.

I will further illustrate this process with reference to the accompanying drawing which represents diagrammatically and conventionally some forms of apparatus adapted for the practice of said process, tho said process can be practiced in other forms of apparatus as will appear from the following description:

In the accompanying drawing:

Fig. 1 is a fragmentary vertical section of one form of apparatus found advantageous;

Fig. 2 is a fragmentary vertical section of another form of apparatus, and

Fig. 3 is a fragmentary vertical section of still another form of apparatus.

Referring more specifically to the accompanying drawing, 1 designates a channel, or cooling surface, upon which is deposited the carbon black produced by the incomplete combustion of the hydrocarbon gases emitted thru burner pipe 2. Burner tips 3 may be of any desired type, such as round, bat-wing or fish-tail, for example. Scraper blades 4 are provided for causing the carbon black to fall in hoppers 7 from which the carbon black is transferred by screw conveyor 10 through conveyor conduit 8 to bolters and packers (not shown). As shown in Figs. 1 and 3, burner tips 3 are not provided adjacent the scraper blades 4 and thus the flames 5 do not impinge on the channel 1 at a point immediately adjacent the scraper blades 4. To heat the channel section not exposed to the flames 5, a burner 6 is provided and is so adjusted as to burn with inverted blue flame without deposition of carbon on the channel 1. In the modification shown in Fig. 2, baffles 9 are interposed in the hoppers 7 to retard the passage of the carbon black thru the hoppers.

The process may be carried out in various ways in the apparatus illustrated as will be evident from the following description. As practiced with reference to the apparatus shown in Fig. 1, a hydrocarbon gas is admitted to the burner pipe 2 and burned with only partial combustion. Black formed by the incomplete combustion of the gas is deposited on the channel 1, the temperature of which is always above 300° C. and is removed therefrom in the usual manner by scraper 4 and caused to fall into the hopper 7 from which it travels to conveyor conduit 8. Before being removed from the channel 1, it will be noted that the black is allowed to remain in free contact with the atmosphere in the burner house, which normally contains about 14% oxygen, during which exposure the carbon black is maintained at a temperature above 300° C. by means of a burner such as illustrated at 6. In the ordinary operation, the flames are in such close proximity to the channel that the carbon black adhering thereto is more or less completely blanketed or sheltered from the burner house atmosphere by the flame atmosphere right up to the point at which it is scraped from the channel; then after being scraped from the channel it drops quickly thru the hopper into a conveyor conduit maintained at relatively low temperature. This condition is modified in this process of manufacture by the elimination of one or more flames contiguous to the scraper as shown in Figs. 1 and 3. By eliminating this blanketing or sheltering effect at this point, an improvement in color and simultaneously in workability of the carbon black is obtained.

The temperature to which the carbon black is exposed after leaving the last flame, but before being scraped off, may be readily adjusted by applying heat to the top of the collecting surface or channel 1 by means of the burner 6, for example. The time and temperature to which the carbon black is exposed to the oxygen-containing atmosphere may vary considerably. As stated above, the collecting surface should always be maintained at a temperature above 300° C. but this temperature should not exceed 1000° C. as too great a combustion loss will occur. In many cases a temperature of about 400° C. has been found particularly advantageous. Where the speed of motion of the channel is fixed, the desired improvement in the carbon black may be obtained within the time limit set by the speed of motion of the channel by proper adjustment of the heat supplied to the top of the collecting surface. Conversely, at fixed temperature the time of exposure of the carbon black to the oxygen-containing atmosphere may be lengthened or shortened by regulation of the channel speed.

In the apparatus illustrated in Fig. 2 the burner tips adjacent the scrapers are not removed, nevertheless the same results are obtained and by the same general principle. In carrying out this process in this form of apparatus, baffles 9 are interposed between the depositing surface and the collecting hoppers, and the black is thereby held for a sufficient length of time to obtain the desired results in a heated zone and exposed to an oxygen-containing atmosphere. The time of exposure is readily controlled by the angle of the inclined planes and by their number. The temperature can be regulated, for example, by fixing the proximity of these baffles to the channel surface. In this form of the process, the carbon black, during its descent thru the hopper into the conveyor, is free to be contacted with by the oxygen-containing atmosphere in the burner house and its descent is retarded long enough to obtain the desired improvement in color and workability.

The operation of this process in the apparatus shown in Fig. 3 will be apparent from the foregoing. In the apparatus illustrated, carbon black may be deposited in the channel 1 and exposed to an oxygen-containing atmosphere before scraping and this treatment may be continued after scraping by means of the baffles 9 located in hoppers 7, or the baffles 9 may be removed and the carbon black subjected to the oxygen-containing atmosphere only before scraping. Whether the carbon black is subjected to the oxygen-containing atmosphere before or after scraping, or both, it is to be clearly understood that the burner 6 may be used in all cases. It is also to be understood that no special form of burner tip or shape of flame is required in this process. A round, bat-wing, fish-tail or any other type burner tip may be used.

In another variant of this process, I extend the conveyor conduit back thru the burner house in a zone where the temperature is in excess of 300° C. and also at an appropriate point remove the top of this conveyor conduit, or by other means provide for free access of air, and thus obtain the desired oxidation and the improvements in respect of color and workability. When necessary, auxiliary burners may be used so as to insure that the conveyor reaches the required temperature.

In some cases, it is useful to carry out the last described variant of the process entirely outside of the burner house. To offset the disadvantage of having to use a larger amount of gas for keeping up the temperature of the conveyor, there is the advantage of being able to handle the output of a large number of burner houses at one time thru combining their production into one conveyor. Whether the treatment of the black is carried out within the burner house or outside will, of course, depend upon the relative costs of the two operations in particular cases.

The way in which the color and workability characteristics of my new color black are influenced by the intensity of my oxidizing treatment is perhaps more clearly illustrated with reference to the last-described variant according to which the oxidizing step is carried out entirely outside of the burner house. For example, in one particular case the conveyor conduit moving the black from the burner house to bolters and packers was passed thru a furnace so arranged that the conveyor tube was heated on its lower side, the upper portion of said tube being open so as to expose to the atmosphere the black passing therethru. The black being coveyed from the burner house and subjected to this process of controlled oxidation was ordinary color black and the color and workability characteristics thereof, as determined by the procedure heretofore described, appear in Tables II and III opposite the letter "F". This ordinary color black was subjected to controlled oxidation at a temperature of 510 C. for 36 minutes, resulting in a marked improvement in workability without marked effect upon the color characteristic. The color and workability characteristics of the product so treated appear in Tables II and IV opposite the letter "G". This oxidizing treatment was continued at the same temperature until the black had been subjected thereto for a total of 54 minutes and a further sample taken. An examination of this latter sample showed a still greater improvement in the workability characteristic and a marked improvement in the color characteristic. These characteristics as determined by the procedure herein described appear in Tables II and IV opposite the letter "H". The ratio of the color index to the oil absorption index of the material before being subjected to this oxidizing treatment appears in Table V opposite the letter "F" and this ratio of the black after treatment appears in Table VI opposite the letters "G" and "H".

The intensity of the treatment as stated above may be controlled by varying the temperature or by varying the time. The time element may be varied by the length of the portion of the conveyor subjected to the treating temperature and open to the atmosphere. One method which I have found satisfactory and which was used in connection with the specific example given above is that of maintaining the temperature constant and changing the time element by varying the speed of the conveyor.

Commercial carbon blacks made by my process have been tested by the test methods described herein and found to have the properties, with respect to color and workability, specified in Tables II, IV and VI opposite the letter I. Where circumstances warrant the additional cost of production, the ratios of color index to oil absorption index specified in Table VI may be materially exceeded beyond the ratio 2.08 shown in this table without reducing the color index to as low as 25.

From an economic point of view, this process has distinct advantages in that the yield of carbon black may be kept at a relatively high value thru the use of existing burner tips, channel settings, etc., and yet an improved black of higher color or of improved workability, or both be obtained. I have found that by regulation of the temperature of the channel and of the widths of gap between the flames and the collecting scrapers, shown in Figs. 1 and 3 of the drawing, or by otherwise varying the intensity of the oxidizing operation for instance as described in connection with the specific example given above, I can produce a carbon black of distinctly better color with unimpaired workability, or a carbon black of unimpaired color but with strikingly improved workability, or a carbon black of distinctly better color and with strikingly improved workability. In any case, however, the process is marked by the definite step of exposing the black immediately after deposition to the action of an oxidizing atmosphere at temperatures at or greater than 300° C.

Tho I have found the above-described method and apparatus advantageous in many respects in making my new carbon black product, that description is illustrative only and is not to be interpreted as limiting my present invention to a product made in accordance therewith.

I claim:

1. A carbon black product of high color intensity and having a high degree of workability, its color index being in excess of twenty-five and its ratio of color index to its oil absorption index being in excess of unity.

2. A carbon black product of high color intensity and having a high degree of workability, its color index being in excess of twenty-five and its ratio of color index to its oil absorption index being in excess of two.

WILLIAM BRYAN WIEGAND.